US007221875B2

(12) United States Patent
Sakamoto

(10) Patent No.: US 7,221,875 B2
(45) Date of Patent: May 22, 2007

(54) DIAPHRAGM STRUCTURE OF LIGHT-SOUND CONVERTER

(75) Inventor: Yoshio Sakamoto, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 714 days.

(21) Appl. No.: 10/451,924

(22) PCT Filed: Nov. 8, 2002

(86) PCT No.: PCT/JP02/11684

§ 371 (c)(1),
(2), (4) Date: Jun. 27, 2003

(87) PCT Pub. No.: WO03/043376

PCT Pub. Date: May 22, 2003

(65) Prior Publication Data

US 2004/0062406 A1 Apr. 1, 2004

(30) Foreign Application Priority Data

Nov. 16, 2001 (JP) ............................ 2001-351355

(51) Int. Cl.
*H04B 10/02* (2006.01)

(52) U.S. Cl. ....................... 398/133; 381/172; 381/196

(58) Field of Classification Search ................ 381/172, 381/337, 339, 342, 345–348, 403, 423, 430, 381/171, 174, 433, 398; 362/86; 398/134, 398/133

See application file for complete search history.

(56) References Cited

U.S. PATENT DOCUMENTS 4,315,112 A * 2/1982 Hofer ......................... 381/186
4,367,377 A 1/1983 Yamaguchi et al.
5,995,260 A * 11/1999 Rabe .......................... 398/115
6,208,237 B1 * 3/2001 Saiki et al. .............. 340/388.1
6,607,051 B1 * 8/2003 Peng .......................... 181/171

FOREIGN PATENT DOCUMENTS

| | | |
|---|---|---|
| CN | 1302524 | 7/2001 |
| JP | 36-017558 | 9/1961 |
| JP | 56-013898 | 2/1981 |
| JP | 60-123197 | 7/1985 |
| JP | 11-069488 | 3/1999 |
| WO | 98/51123 | 11/1998 |

OTHER PUBLICATIONS

International Search Report, Feb. 4, 2003.
Office Letter dated Aug. 22, 2006 from the Japanese Patent Office for Application No. 2001-351355.

* cited by examiner

*Primary Examiner*—Kennth Vanderpuye
*Assistant Examiner*—Guerssy Azemar
(74) *Attorney, Agent, or Firm*—Eric J. Robinson; Robinson Intellectual Property Law Office, P.C.

(57) ABSTRACT

An optical-acoustic transducer in which light is irradiated to a reflecting portion from a light emitter, and a reflected light from the reflecting portion is received with a light receiver to detect a position of a vibrating section, cantilevers are formed by performing slit working for a diaphragm, portions between an outer circumference edge of the vibrating section and inner circumference edges of the cantilevers and portions between an inner circumference edge of a supporting portion and outer circumference edges of the cantilevers are partitioned by the slit working, and the cantilevers extend along an outer circumference of the vibrating section.

6 Claims, 17 Drawing Sheets

DIAPHRAGM STRUCTURE OF LIGHT-SOUND CONVERTER

TECHNICAL FIELD

The present invention relates to an optical-acoustic transducer and more particularly to a diaphragm structure thereof.

BACKGROUND ART

As a conventional acousto-electric transducer using light (hereinafter referred to as an optical-acoustic transducer), there is known an optical-acoustic transducer shown in FIG. 13, in which a plane diaphragm 11 is fixed to a frame 4 via a ring 3, a light emitter 5 and a light receiver 6 are further fixed to the frame 4, and light irradiated from the light emitter 5 and reflected at the diaphragm 11 is received at the light receiver 6, whereby a position of the diaphragm 11 namely, a vibration is converted into an electric signal.

In an optical acoustic transducer shown in FIG. 13, a diaphragm is flat, and therefore compliance of the diaphragm 11 cannot be made large. To eliminate the disadvantage, in a conventional optical-acoustic transducer shown in FIG. 14, the cross section of the part from the center of a diaphragm 12 to a perimeter portion is formed in a corrugated form so that a valley and a peak are formed, the perimeter portion is fixed to the frame 4, and the light emitter 5 and the light receiver 6 are fixed to the frame 4.

In a conventional optical-acoustic transducer shown in FIG. 15, a dome-shaped reflecting portion 13*a* is provided at a center of a diaphragm 13, corrugation is formed from the reflecting portion 13*a* to a perimeter portion, a supporting portion 13*b* provided at the perimeter portion is fixed to the frame 4, and the light emitter 5 and the light receiver 6 are fixed to the frame 4.

In order to reduce the optical-acoustic transducers in size and transduce sound with high sensitivity, it is necessary to reduce the diaphragms in size and increase compliance. An optical-acoustic transducer, which is proposed in Japanese Patent Application No. 2001-184530 in response to the requirement, is shown in FIG. 16 and FIG. 17.

Namely, an optical-acoustic transducer using a diaphragm 14, which is provided with a dome-shaped reflecting portion 14*a* at a center and a corrugation between the reflecting portion 14*a* and a supporting portion 14*b*, is further improved by cutting predetermined spots of the diaphragm 14 with laser light or the like to form arc-shaped slits 15*a* and spiral slits 15*b*.

The supporting portion 14*b* of the diaphragm 14 is fixed to the frame 4. Though the illustration of a light emitter and a light receiver is omitted in FIG. 16 and FIG. 17, the light emitter and the light receiver are fixed to the frame as in the above-described prior arts. The spiral slits 15*b* and the arc-shaped slits 15*a* construct cantilevers 14*c*, 14*c*, . . . , and a substantially maximum outer side portion of a vibrating section, whereby amplitude performance of the diaphragm 14 is improved and performance of the optical-acoustic transducer is enhanced.

However, it is obvious that the optical-acoustic transducers in these days have extremely increasing requirement for reduction in size, and to respond to the requirement for size reduction, the diameter of the vibration plate 14 formed in the dome shape as shown in FIG. 16 cannot help being made small. Since part of the vibrating plate 14 is cut in this example, the proportion occupied by the cantilever area is increased and the area of the diaphragm 14 is reduced as the diameter of the diaphragm 14 becomes smaller, and as a result, it cannot be denied that the structure of this diaphragm is such that an air pressure receiving area cannot help being reduced.

The aforementioned Japanese Patent Application No. 2001-184530 describes that it is preferable to provide a rib structure at an outer side portion of the adjacent vibrating section when suspension of the cantilevers 14*c* is provided at part of the diaphragm 14, but the shape of the diaphragm 14 becomes a complicated three-dimensional structure, and as a matter of course, there arises the problem that the production cost of the forming die and the like of the diaphragm 14 tends to be high.

DISCLOSURE OF THE INVENTION

This invention is made to solve the above-described problems, and has its object to provide an optical-acoustic transducer with the performance being improved, which makes it possible to reduce cost and is suitable for mass production, by improving and developing the structure: especially, the shape; and the placement and shape of the suspension in a cantilever form, of the diaphragm proposed in the aforementioned Japanese Patent Application No. 2001-184530 by the applicant of the present invention.

In order to solve the above-described problems, attention is paid not only to the shape of the suspension in the cantilever form but also to the position for placement, in obtaining the shape of the suspension in the cantilever form. In this case, in order to receive the vibration of air efficiently, it is obvious that the larger the area of the vibrating section of the diaphragm, the better, as a matter of course.

However; with the method of providing the suspension in the cantilever form up to the middle of the diaphragm as in the prior art, if the diameter of the entire diaphragm except for the reflecting portion is set to be small, the proportion occupied by the suspension in the cantilever form naturally has to be larger.

In order to solve the above problem, as means for vibrating the vibrating section of the diaphragm made by forming a thin film such as a film, especially, the diaphragm with a small diameter, with compliance being reduced, the structure, in which a flat portion with the cross sectional shape extending in the horizontal direction further to the outside from an outer circumference portion of the vibrating section provided outside the reflecting portion is provided at the entire circumference, slit working as fine as possible is applied to the flat portion in the state following the outer circumference shape of the aforementioned vibrating section, or the outer circumference portion of the vibrating section provided outside the reflecting portion, and the suspension in the cantilever form is placed, can be considered.

Consequently, the diaphragm structure of the optical-acoustic transducer of this invention is used for an optical-acoustic transducer in which a light emitter and a light receiver are placed to oppose to a reflecting portion formed at a vibrating section of the diaphragm formed by connecting the vibrating section and a supporting portion with cantilevers, light is irradiated to the aforesaid reflecting portion from the aforesaid light emitter, and the reflected light from the aforesaid reflecting portion is received with the aforesaid light receiver to detect a position of the aforesaid vibrating section, and is characterized in that the aforesaid cantilevers are formed by performing slit working for the aforesaid diaphragm, and a portion between an outer circumference edge of the aforesaid vibrating section and inner circumference edges of the aforesaid cantilevers and a portion between an inner circumference edge of the aforesaid support portion and outer circumference edges of the aforesaid cantilevers are partitioned by the aforesaid slit working, and the aforesaid cantilevers extend along an outer circumference of the aforesaid vibrating section.

In the aforesaid diaphragm structure, a slit for partitioning the portion between the outer circumference edge of the aforesaid vibrating section and the inner circumference edges of the aforesaid cantilevers and the portion between the inner circumference edge of the aforesaid supporting portion and the outer circumference edges of the aforesaid cantilevers comprises: at least three arc-shaped inner slits formed at the outer circumference of the vibrating section; at least three arc-shaped outer slits existing outside the inner slits and formed at the inner circumference of the aforesaid supporting portion; and radial slits each coupling one end of each inner slit and one end of the outer slit formed outside the other inner slit adjacent to the one end of the inner slit.

In the aforesaid diaphragm structure, one end of the aforesaid cantilever is connected to the aforesaid vibrating section by a portion between the one end of each of the inner slits at a side to which the radial slit is coupled, and the one end of the other inner slit adjacent to the inner slit, at a side to which the radial slit is not coupled, and the other end of the cantilever is connected to the aforesaid supporting portion by a portion between the one end of each of the outer slits at a side to which the radial slit is coupled, and one end of the other outer slit adjacent to the outer slit, at a side to which the radial slit is not coupled.

In the aforementioned diaphragm structure, a flat portion extending further to an outside from an outer circumference edge of the aforesaid reflecting portion is provided at an entire circumference, and the cantilevers are placed in a state extending along the aforesaid outer edge of reflecting portion.

In the same diaphragm structure, an incline portion with a cross sectional shape rising diagonally is provided outward from the outer circumference edge of the aforesaid reflecting portion, a flat portion with a cross-sectional shape extending in a horizontal direction further to an outside from an outer circumference of the aforesaid incline portion is provided at the entire circumference, and the cantilevers are placed at the aforesaid flat portion in a state extending along following the outer circumference edge of the aforesaid vibrating section.

In the same diaphragm structure, a falling portion with a cross sectional shape at the right angle or an angle substantially the right angle is provided at an entire circumference of the outer circumference edge of the aforesaid reflecting portion, a flat portion with a cross sectional shape extending in a horizontal direction further toward an outside from an outer circumference portion of the aforesaid falling portion is provided at the entire circumference, and the cantilevers are placed at the aforesaid flat portion in a state extending along the outer circumference of the aforesaid vibrating section.

Further in the same diaphragm structure, a rising portion or a falling portion with a cross sectional shape rising or falling vertically or diagonally, or made of an arc is provided at an outer circumference edge of the aforesaid reflecting portion, a flat portion with a cross sectional shape extending, in the horizontal direction further to an outside from an outer circumference edge of the aforesaid rising portion or falling portion is provided along the entire circumference, and the cantilevers are placed at the aforesaid flat portion in a state extending along the outer circumference shape of the vibrating section.

EMBODIMENTS OF THE INVENTION

Embodiments of this invention will be explained based on the drawings. A diaphragm in each embodiment is produced by cutting a resin film in a flat sheet form with thickness of about 9 μ to about 25 μ as it is, or it is produced by cutting after thermal pressure forming.

Figure 1:
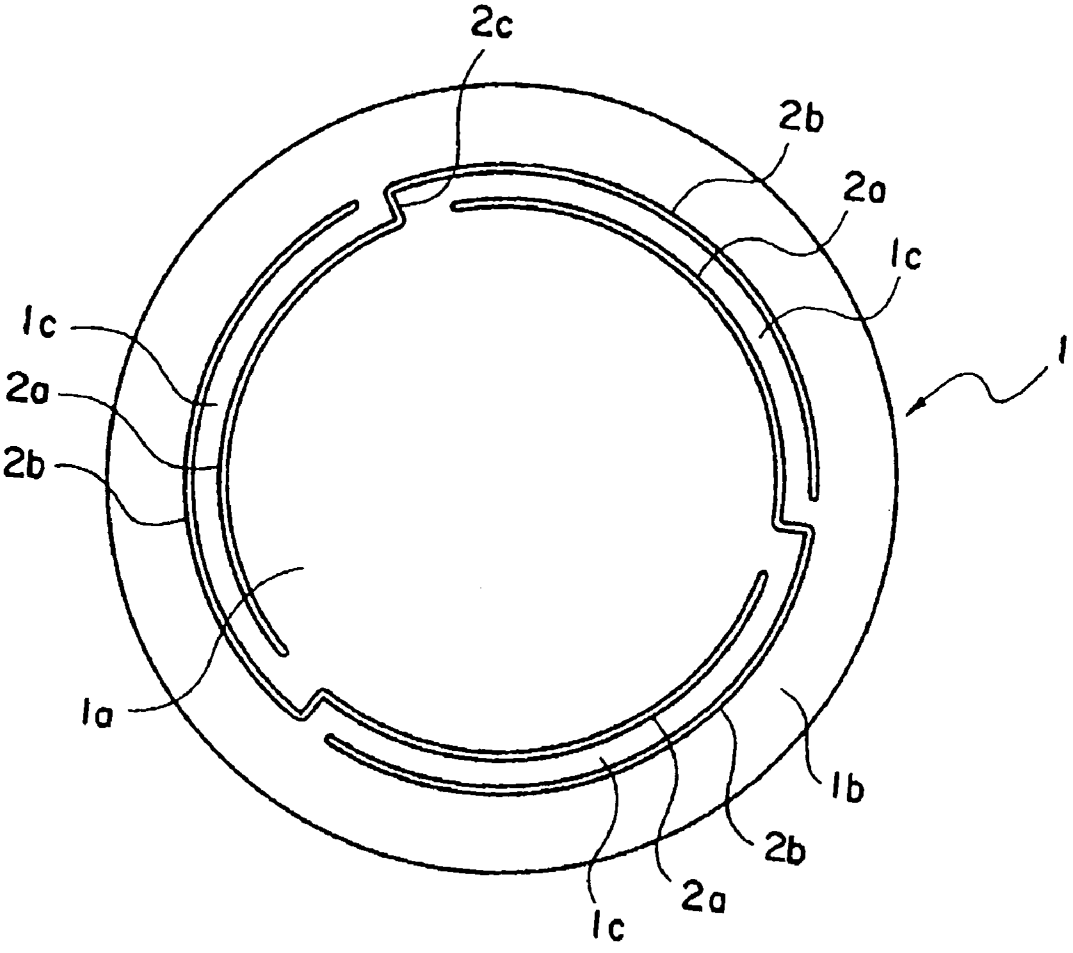
FIG. 1 is a plane view showing a diaphragm of an optical-acoustic transducer being a first embodiment of this invention.
Figure 2:
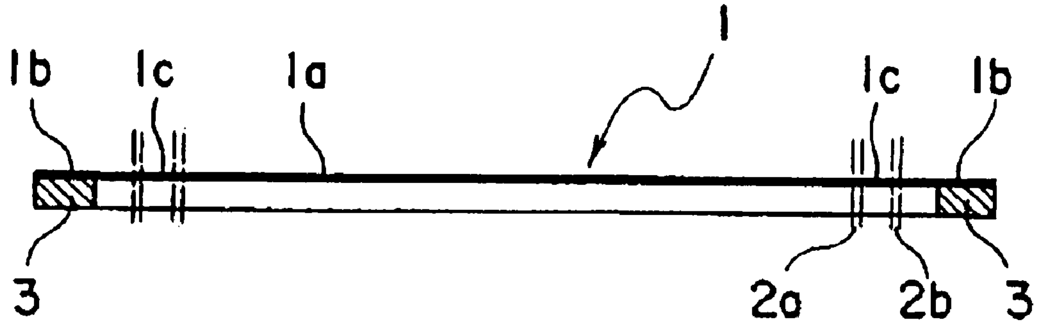
FIG. 2 is a cross sectional view showing the same diaphragm.
Figure 3:
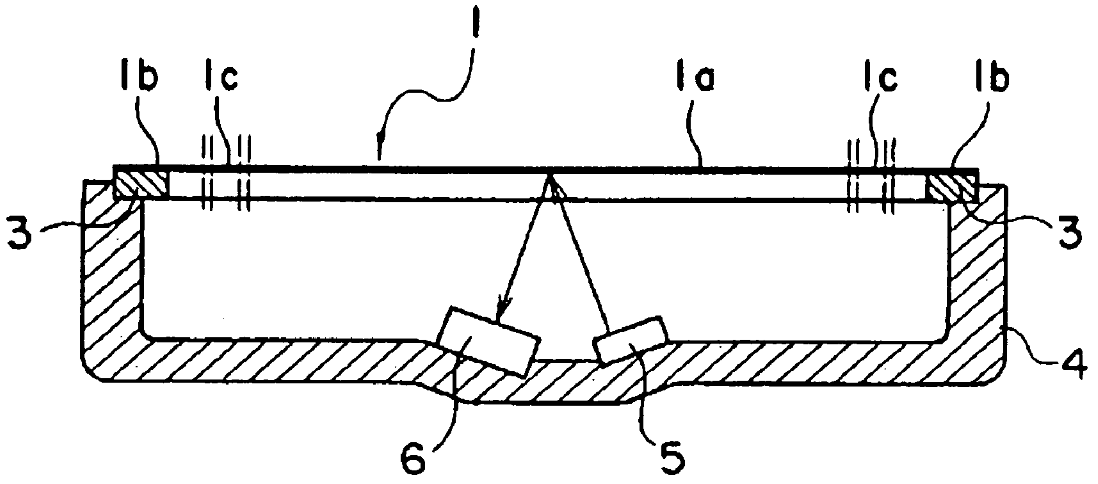
FIG. 3 is a sectional view showing an optical-acoustic transducer using the same diaphragm.

FIG. 1 is a plane view showing a diaphragm of an optical-acoustic transducer being a first embodiment of this invention, FIG. 2 is a cross sectional view showing the same diaphragm, and FIG. 3 is a cross sectional view showing an optical-acoustic transducer using the same diaphragm.

A diaphragm 1 shown in the drawings is a flat sheet with thickness of 15 μ and a diameter of 6 mm, and the diaphragm 1 is produced by applying slit working and attaching a ring 3 to a supporting portion 1*b* of an outer circumference portion by bonding, whereby a desired amplitude can be obtained.

Specifically, three arc-shaped inner slits 2*a*, 2*a* . . . and three arc-shaped outer slits 2*b*, 2*b* . . . are equidistantly formed respectively, and the inner slits 2*a* and the outer slits 2*b* are connected with radial slits 2*c*, whereby cantilevers 1*c*, 1*c*, . . . surrounded by the slits are obtained, and the cantilevers construct a suspension of a vibrating section 1*a* surrounded by the inner slits 2*a*, 2*a*, . . . The long dashed short dashed lines illustrated at the flat portion in the cross sectional view in FIG. 2 shows a position and width of the slit.

Since the cantilevers extend along an outer circumference of the vibrating section, the vibrating section does not become so small even if compliance is made larger by increasing the length of the cantilevers, and as a result, the highly sensitive and compact diaphragm of the optical-acoustic transducer can be obtained.

As shown in FIG. 3, the supporting portion 1*b* of the diaphragm 1 is fixed to the frame 4 via the ring 3, and the light emitter 5 and the light receiver 6 are fixed to the frame 4, whereby the optical-acoustic transducer is completed. Metal vapor deposition is applied to a portion f or reflecting light from the light emitter 5 of the diaphragm 1.

Figure 4:
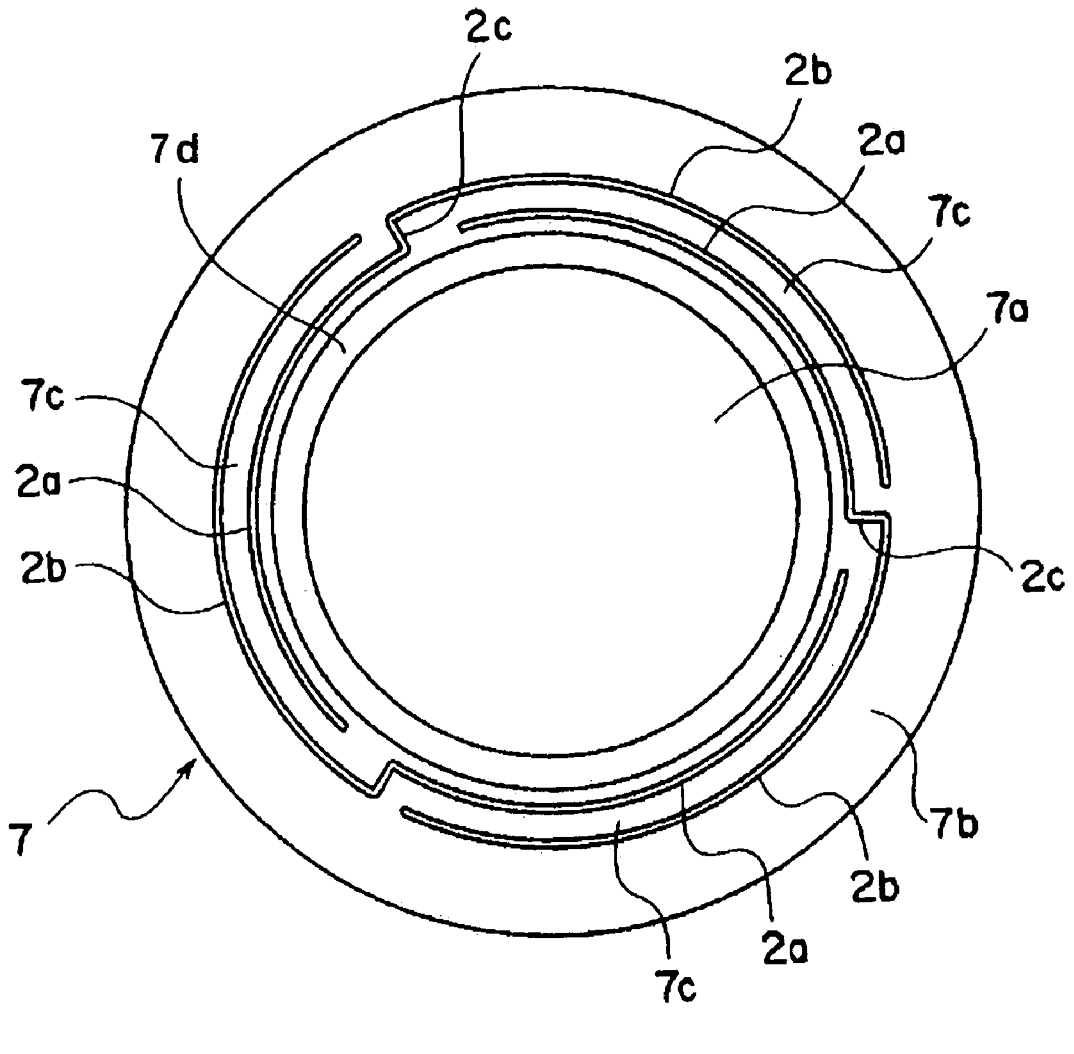
FIG. 4 is a plane view showing a diaphragm of an optical-acoustic transducer being a second embodiment of this invention.
Figure 5:
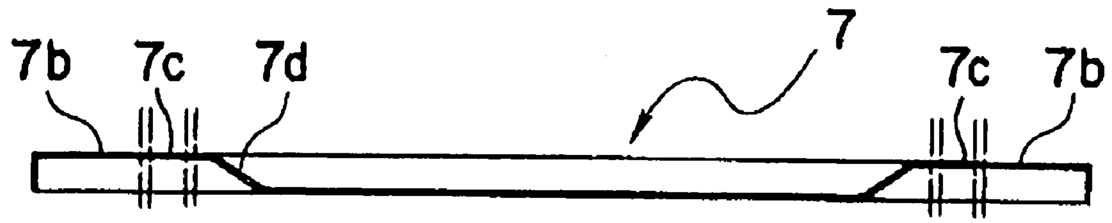
FIG. 5 is a cross sectional view showing the same diaphragm.
Figure 6:
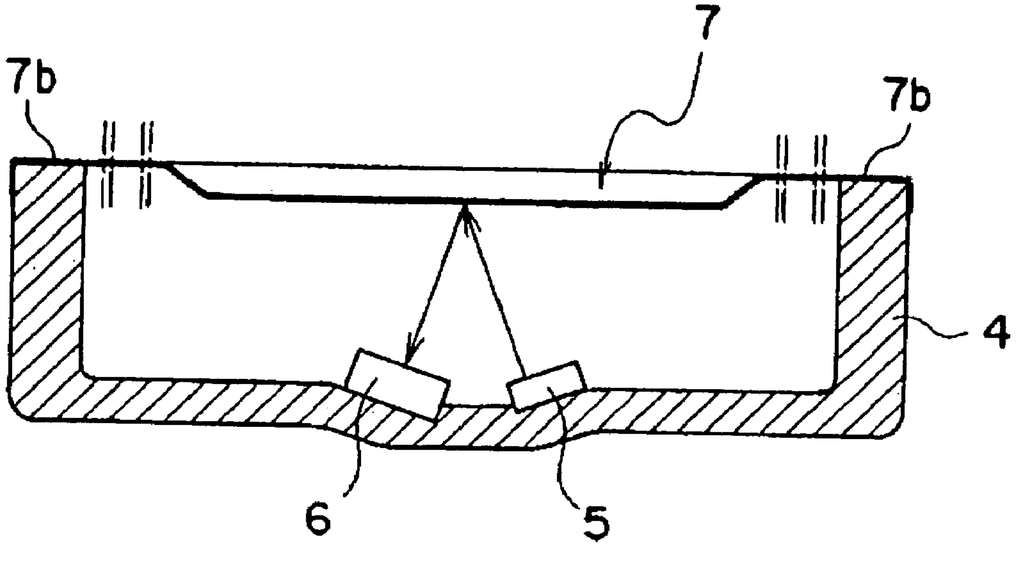
FIG. 6 is a cross sectional view showing an optical-acoustic transducer using the same diaphragm.

FIG. 4 is a plan view showing a diaphragm of an optical-acoustic transducer being a second embodiment of this s invention, FIG. 5 is a cross sectional view showing the same diaphragm, and FIG. 6 is a cross sectional view showing an optical-acoustic transducer using the same diaphragm. In this example, a film of thickness of about 15 μ is formed as shown in FIG. 5, and slit working is applied thereto as in the first embodiment, whereby a diaphragm 7 with a desired amplitude characteristic is obtained.

Explaining the details hereinafter, a plane portion is provided at a center, and an incline portion 7*d* with rising of about 0.6 mm from an outer circumference portion of this plane portion is provided, and a flat portion, which is flat outward from an upper end portion of the incline portion 7*d* in the horizontal direction, is provided. In the case of this embodiment, the flat portion provided at an outside from the outer circumference portion of the aforesaid incline portion 7*d* is cut with a circle with a diameter of 6 mm.

The width of the flat portion is 1 mm, and slits, which are similar to those in the first embodiment, are provided at the flat portion. Specifically, three arc-shaped inner slits 2*a*, 2*a* . . . and three arc-shaped outer slits 2*b*, 2*b* . . . are equidistantly formed respectively, and the inner slits 2*a* and the outer slits 2*b* are connected with radial slits 2*c*, whereby cantilevers 7*c*, 7*c*, . . . with the width of about 0.2 mm, which are surrounded by the slits, are obtained, and the cantilevers construct a suspension of a vibrating section 7*a* surrounded by the inner slits 2*a*, 2*a*, . . . .

The long dashed short dashed lines illustrated at the flat portion in the cross sectional view of FIG. 5 shows a position and width of the slit. More specifically, metal vapor deposition is applied to a reflecting surface of the vibrating section after the diaphragm is formed, and thereafter, slit work is performed in this embodiment. As shown in FIG. 6, the supporting portion 7*b* of the diaphragm 1 is fixed to the frame 4, and the light emitter 5 and the light receiver 6 are fixed to the frame 4, whereby the optical-acoustic transducer is completed. Since the inclined surface is provided at the vibrating section of the diaphragm in this example, the rigidity of the vibrating section is enhanced, and the optical-acoustic transducing characteristic is further improved.

Figure 7:
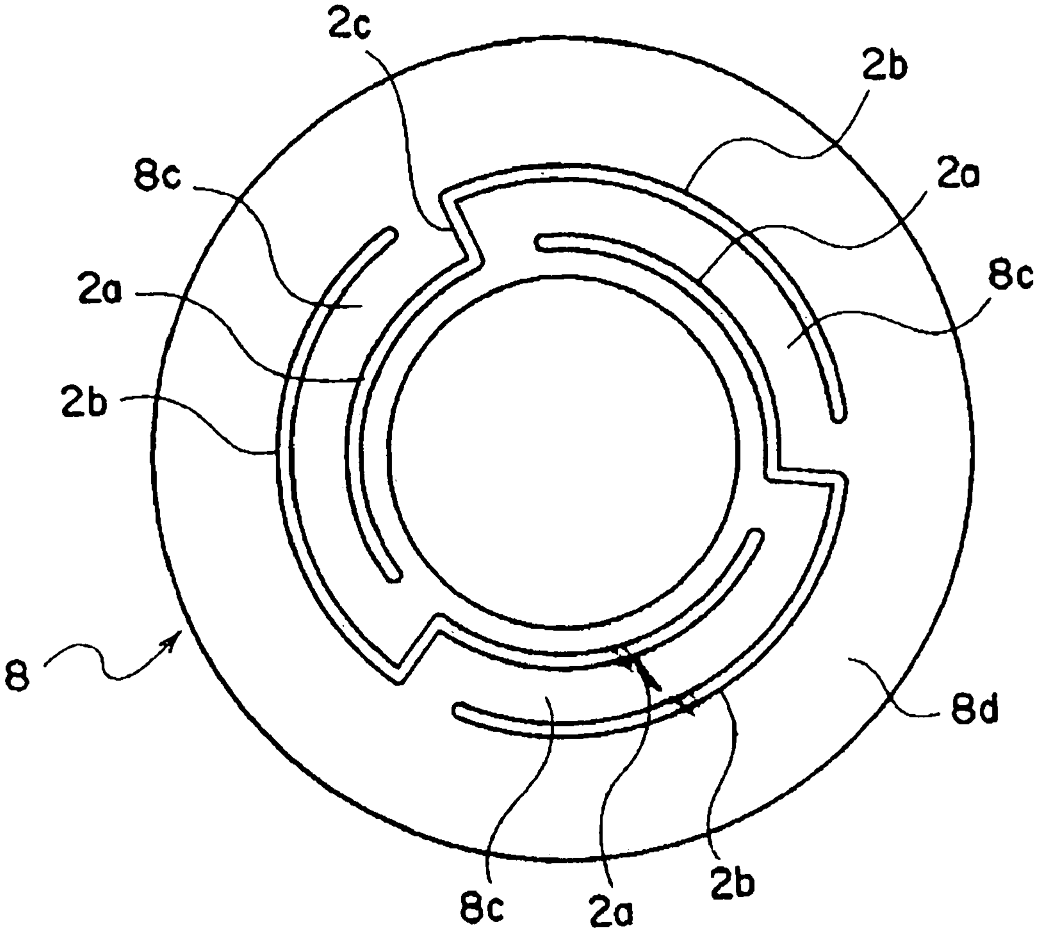
FIG. 7 is a plan view showing a diaphragm of an optical-acoustic transducer being a third embodiment of this invention.
Figure 8:
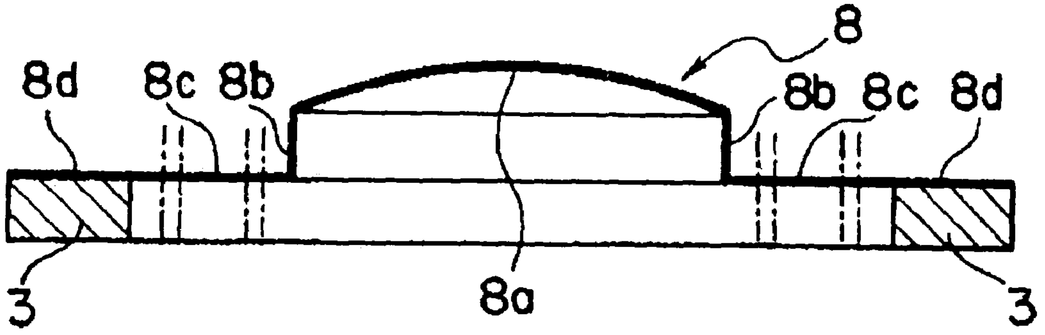
FIG. 8 is a cross sectional view showing the same diaphragm.
Figure 9:
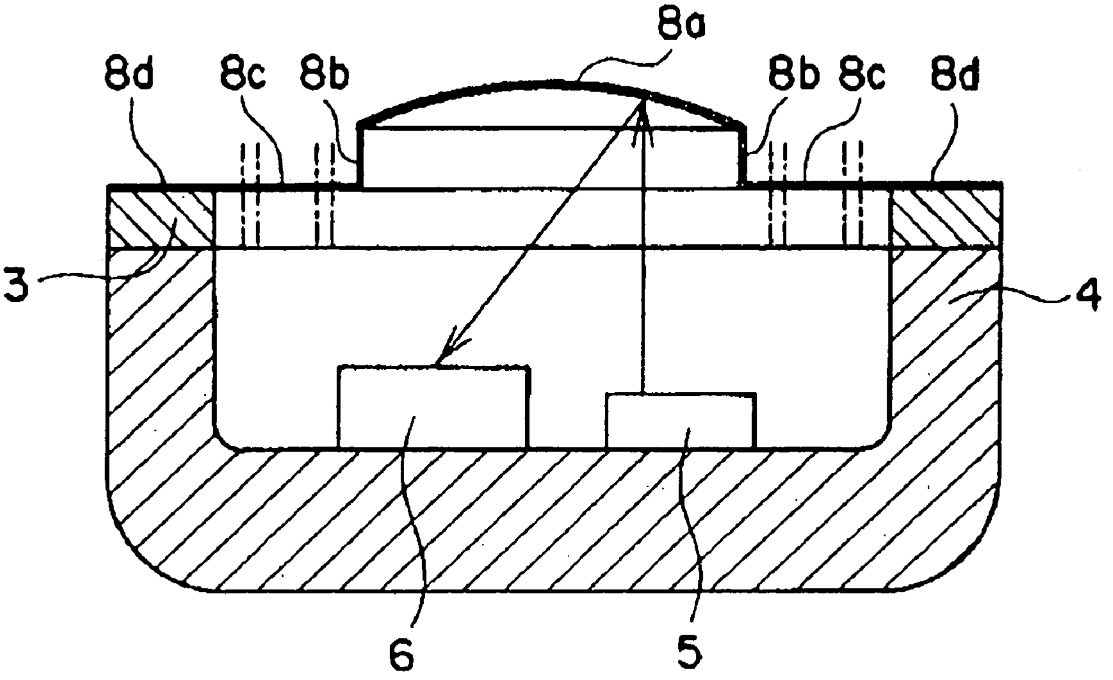
FIG. 9 is a cross sectional view showing an optical-acoustic transducer using the same diaphragm.

FIG. 7 is a plane view showing a diaphragm of an optical-acoustic transducer being a third embodiment of this invention, FIG. 8 is a cross sectional view showing the same diaphragm, and FIG. 9 is a cross sectional view showing the optical-acoustic transducer using the same diaphragm. In this example, a reflecting portion 8*a* formed in a dome shape with the diameter of 1.3 mm and the radius of curvature of 1.5 mm is provided at a center of a diaphragm 8 as shown in the cross sectional view in FIG. 8. At the outermost circumference portion of this dome, a falling portion 8*b* of the length of 0.5 mm is provided downward in the drawing on the entire outer circumference of the dome, a flat portion with the width of about 1.5 mm with the cross sectional shape extending in the horizontal direction to an outside from a lower end of the falling portion 8*b* is provided at the entire circumference, and this flat portion is cut with a circle with the diameter of 3 mm.

Slit working is applied to the spots outside from the falling portion 8*b* provided at the outer circumferential portion of the aforementioned dome, at spaces of predetermined dimensions as shown in the plane view of FIG. 7, in the state extending along the outer circumference of the falling portion 8*b*. Explaining in detail, in the case of this embodiment, three inner slits 2*a*, 2*a*, . . . with the width of 40 μ to 50 μ, which are the arcs of substantially three equal parts (radius of curvature of 1.225 mm), are provided at the spot of the radius of 0.775 mm shown in the plane view which is outside the outer circumference of the dome.

Slit working constituted of arcs (radius of curvature of 1.425 mm) with the same width as described above (40 μ to 50 μ) which are substantially three equal parts, is applied to the spot of the radius of 1.425 mm outside the aforementioned inner slits 2*a*, 2*a*, . . . , to provide three arc-shaped outer slits 2*b*, 2*b*, . . . , and slit working is further applied such that the outer slits 2*b* and the inner slits 2*a* are connected with the radial slits 2*c* as shown in the drawings. The long dashed short dashed lines illustrated at the flat portion in the cross sectional view of FIG. 8 shows a position and width of the slit.

A cantilever 8*c* is formed by being surrounded by the aforementioned slits: the inner slit 2*a*, the outer slit 2*b* and the radial slit 2*c*, and the cantilever 8*c* becomes a suspension for supporting the reflecting portion 8*a* at a supporting portion 8*d*.

In the case of this embodiment, the suspension is constructed by three cantilevers 8*c* in the form along the outer circumference of the reflecting portion 8*a*, and the supporting portion 8*d* of the flat portion, which is provided outside the outer slits 2*b*, 2*b*, . . . has the function of a margin to overlap or the like for the purpose of fixing the diaphragm 8 to the ring 3, which is in the state as shown in the cross sectional view of the explanatory view to have the structure of supporting the reflecting portion 8*a* at the cantilevers 8*c*, 8*c*, . . . with the width of about 0.2 mm.

As shown in FIG. 9, the supporting portion 8*d* of the diaphragm 8 is fixed to the frame 4 via the ring 3, and the light emitter 5 and the light receiver 6 are fixed to the frame 4, whereby the optical-acoustic transducer is completed. Since the reflecting portion is in the dome shape in this embodiment, the optical-acoustic transducing characteristic is further improved.

Figure 10:
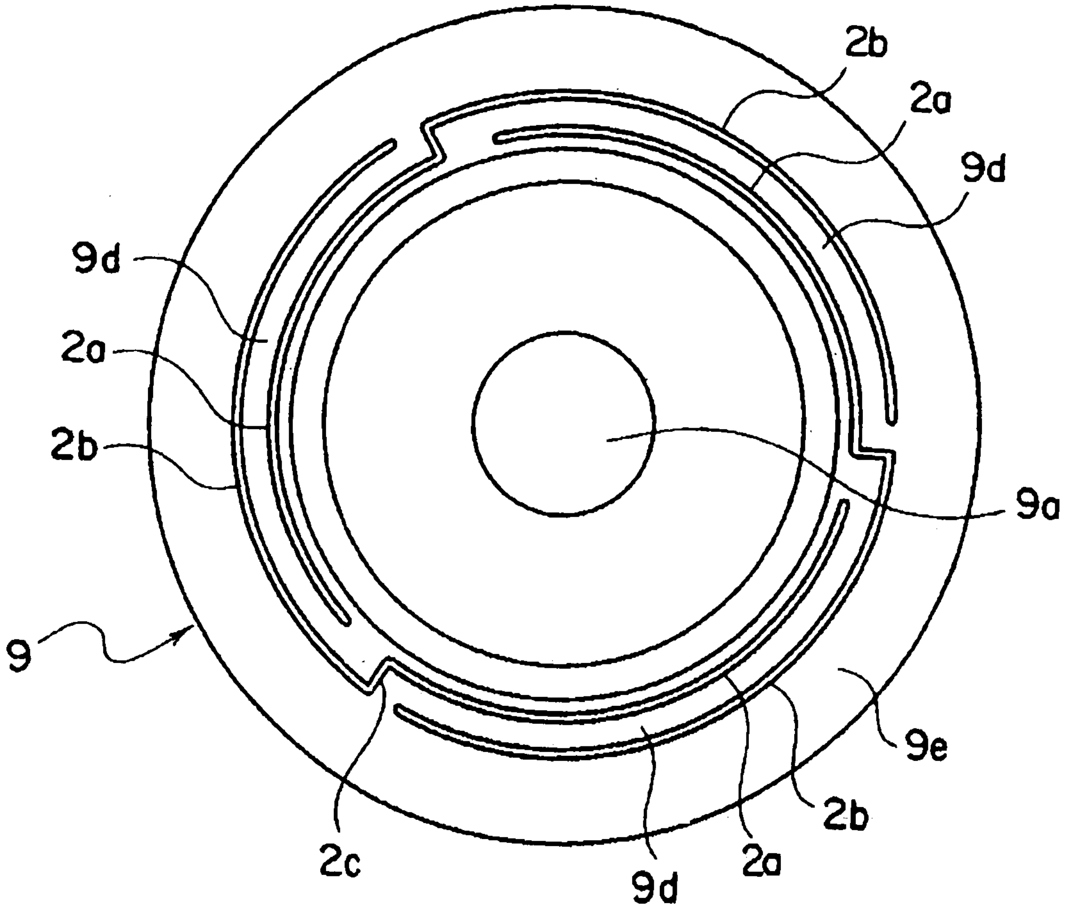
FIG. 10 is a plane view showing a diaphragm of an optical-acoustic transducer being a fourth embodiment of this invention.
Figure 11:
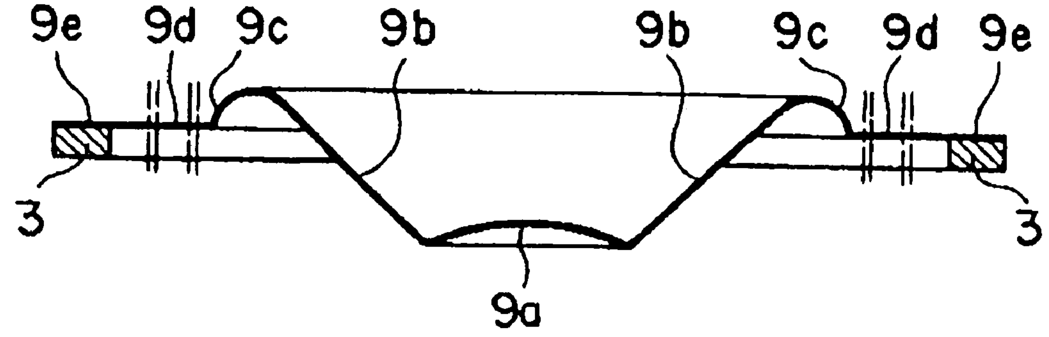
FIG. 11 is a cross sectional view showing the same diaphragm.
Figure 12:
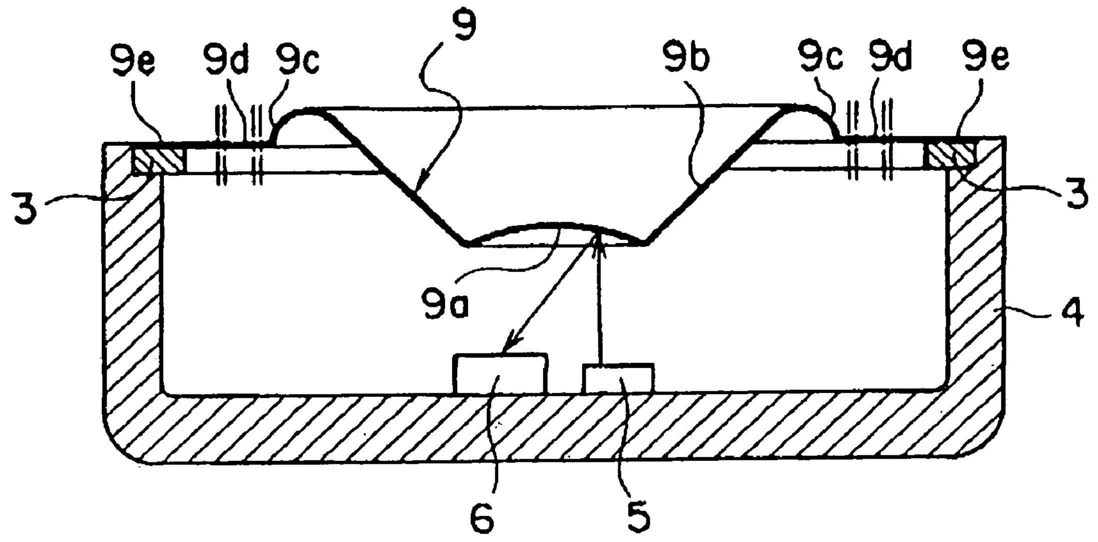
FIG. 12 is a cross sectional view showing an optical-acoustic transducer using the same diaphragm.
Figure 13:
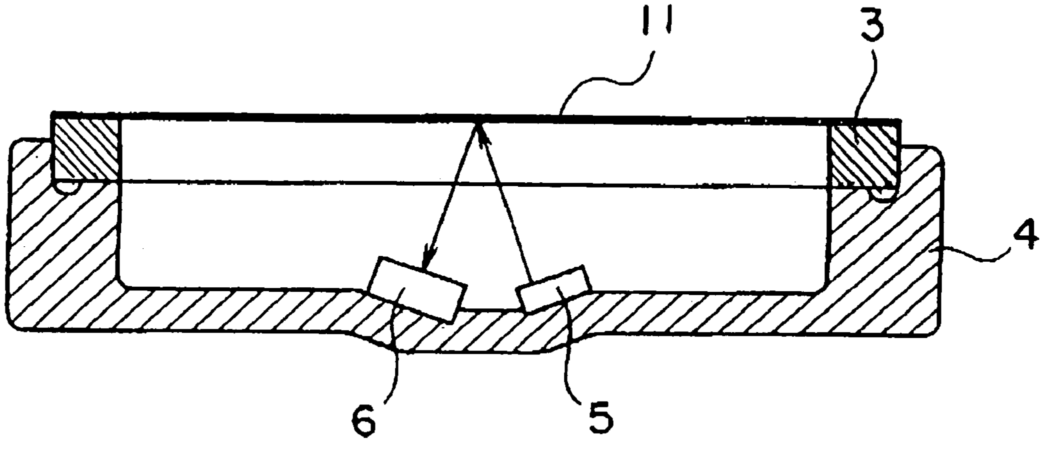
FIG. 13 is a cross sectional view showing an example of a conventional optical-acoustic transducer.
Figure 14:
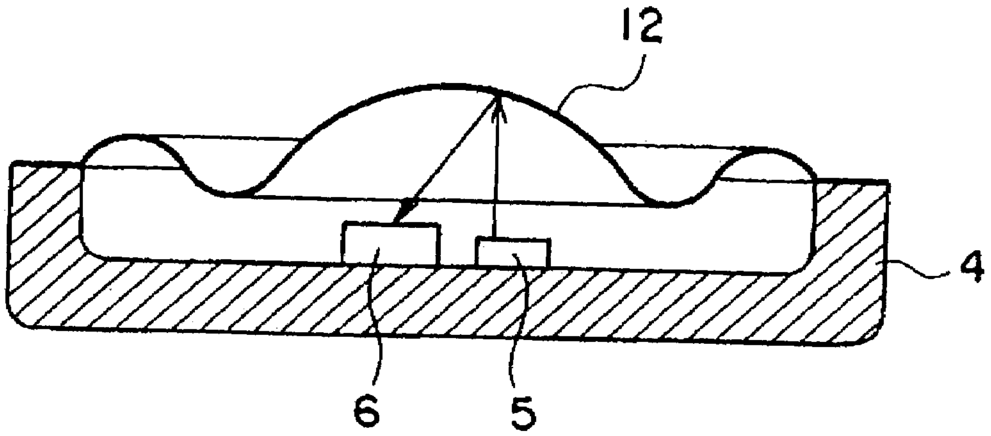
FIG. 14 is a cross sectional view showing another example of a conventional optical-acoustic transducer.
Figure 15:
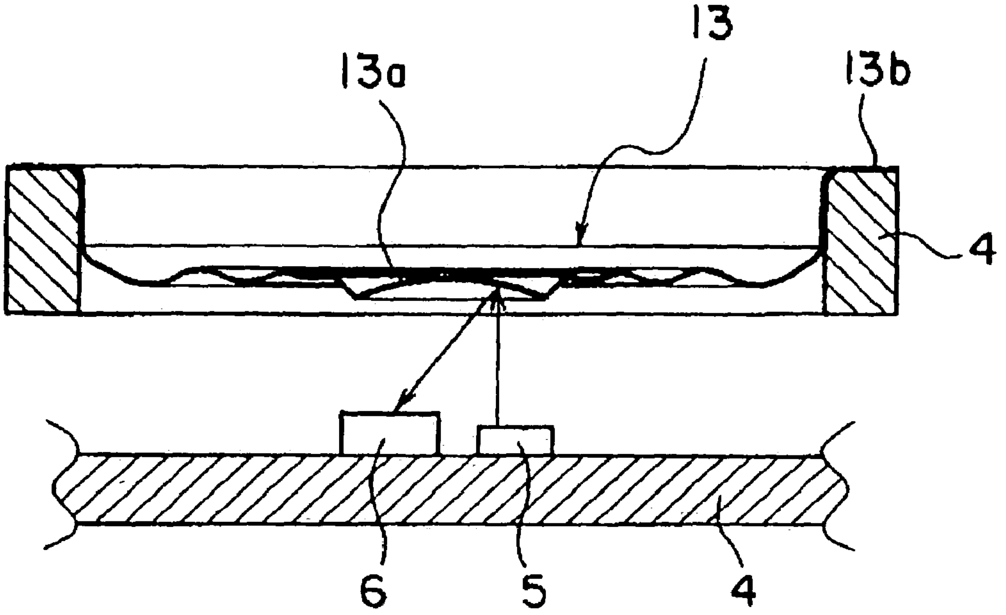
FIG. 15 is a cross sectional view showing still another example of a conventional optical-acoustic transducer.
Figure 16:
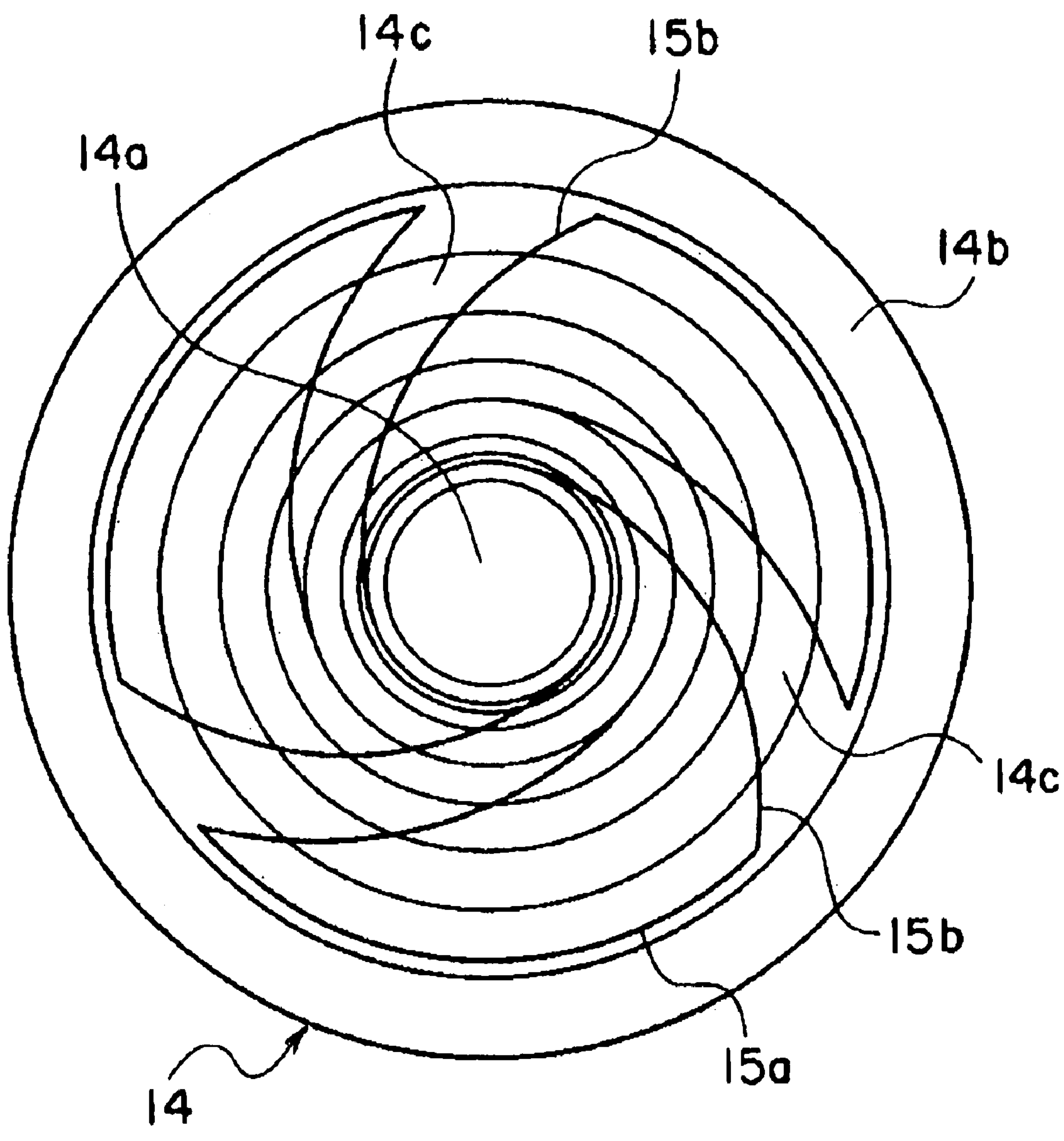
FIG. 16 is a plane view showing yet another example of a conventional optical-acoustic transducer.
Figure 17:
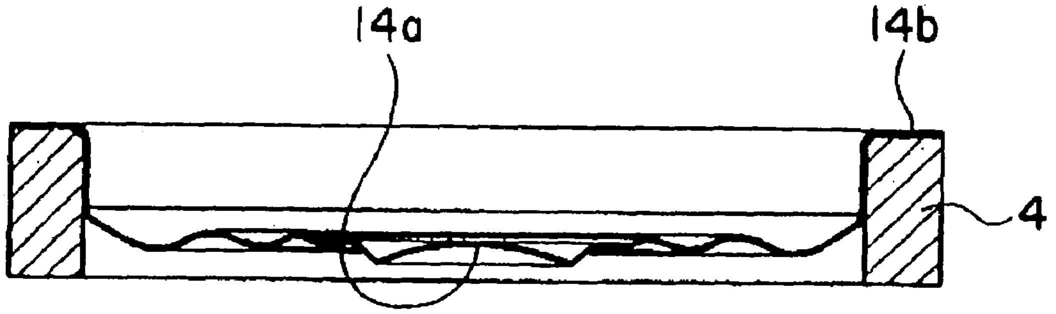
FIG. 17 is a cross sectional view showing part of the same optical-acoustic transducer.

FIG. 10 is a plane view showing a diaphragm of an optical-acoustic transducer as a fourth embodiment of this invention, FIG. 11 is a cross sectional view showing the same diaphragm, and FIG. 12 is a cross sectional view showing the optical-acoustic transducer using the same diaphragm. As shown in the drawings, a reflecting section 9*a* formed in a dome shape with the diameter of 1.3 mm and the radius of curvature of 1.5 mm is provided at a center of a diaphragm 9.

An incline portion 9*b* rising diagonally at an inclination of 45 degrees from an outer circumference portion of this dome, namely, the reflecting portion 9*a*, is provided, and a top end portion of the incline portion 9*b* is set to have the diameter of about 3.2 mm, a cross-sectional arc portion 9*c* with the radius of 0.24 mm is provided with this top end portion as a tangential line, and a flat portion extending in the direction of 90 degrees outside the cross sectional arc portion 9*c*, namely, in the horizontal direction shown in the drawing.

The diameter of the outer circumferential portion of the cross sectional arc portion 9*c* provided at the top end portion of the aforementioned incline portion 9*b* is 4 mm. In the case of this embodiment, the flat portion provided outside from the outer circumferential portion of the aforementioned cross sectional arc portion 9*c* is cut with the circle with the diameter of 6 mm. Accordingly, the width of the flat portion is 1 mm, and slits are provided at this flat portion as shown in FIG. 10.

Explaining in detail, three of the arc-shaped inner slits 2*a*, 2*a* . . . with the width of 40 μ to 50 μ, which are substantially three equal parts, are provided at the spots of the radius of 2.215 mm, three of the arc-shaped outer slits 2*b*, 2*b* . . . with the width of 40 μ to 50 μ, which are substantially three equal parts, are formed at the spots of the radius of 2.375 mm, and the inner slits 2*a* and the outer slits 2*b* are connected with the radial slits 2*c*, whereby the cantilevers 9*d*, 9*d* . . . surrounded by the slit are obtained, and the cantilevers construct a suspension of the vibrating section surrounded by the inner slits 2*a*, 2*a* . . . .

The flat portion provided outside the outer slits 2*b*, 2*b* . . . becomes a support portion 9*e* having the function of a margin to overlap or the like for the purpose of fixing the diaphragm 9 to the ring 3 or the like. The cantilevers 9*d* with the width of about 0.2 mm have the function of suspension and support the reflecting portion 9*a* and the incline portion 9*b* as shown in the cross sectional view in FIG. 11. The long dashed and short dashed lines illustrated at the flat portion in the cross sectional view in FIG. 11 show the position and width of the slit.

Since the back sides of the diaphragms of the aforementioned third and fourth embodiment, namely, the surfaces inside the domes become the reflecting surfaces for laser light, metal vapor deposition or the like of nickel, aluminum, or the like is applied to this reflecting surface. It is possible to perform metal vapor deposition only for the reflecting portions 8*a* and 9*a* by masking. In the case of these embodiments, slit working is performed by using excimer laser, yag laser, carbon dioxide laser and the like, and it was possible to attain the intended purpose in any laser.

The aforementioned third and the forth embodiment are diaphragms with the vibrating section such as the reflecting portion being formed three-dimensionally, but it turns out that the invention is applicable to plane diaphragms as in the first embodiment.

ADVANTAGES OF THE INVENTION

According to the diaphragm structure of the present invention, the cantilever-shaped suspension is naturally placed outside the diaphragm. It is obviously easier to secure the length of the cantilever in the outer circumferential part (outside) than in the inner circumferential part (inside). Namely, it is possible to set the compliance of the suspension in the cantilever form at a higher level, which results in the advantages of having the basic structure capable of securing large amplitude and the area of the vibrating section of the diaphragm does not have to be reduced significantly due to the cantilevers.

It is obvious that if the area of the diaphragm is reduced to the minimum limit as in the third embodiment, it becomes advantageous that the dome portion of the reflecting portion 8*a* also serves as the vibrating section. In this situation, it is not necessary to place the suspension by applying slit working to the reflecting portion, namely, the vibrating section as in the prior art, and the suspension is placed at the outer circumference portion of the vibrating section, whereby the advantage of capable of reducing the diaphragm to the limit is provided. Further, by providing the incline portion 9*b* outside the reflecting portion 9*a* as in the fourth embodiment, strength of the diaphragm is increased and the surface area of the vibrating section is increased as a matter of course.

Namely, the pressure receiving area for sound pressure increases with high strength, and the cross-sectional arc portion 9*c*, or the rising portion, or the falling portion or the like is provided at the outer circumference portion of the incline portion 9*b*, thereby making it possible to increase strength of the outer circumference portion of the diaphragm is increased and increase the surface area of the diaphragm at the same time. Accordingly, it becomes possible to obtain the diaphragm with high sensitivity, high sound quality and the structure facilitating amplitude, and thus the effect of obtaining the diaphragm with higher performance.

The above-described Japanese Patent Application No. 2001-184530 already discloses that the deformation of the reflecting portion can be effectively prevented by giving the rib structure to the outermost circumference portion of the reflecting portion, and it is naturally preferable to enhance rigidity of the rib structure by providing the structure of the rising portion or the falling portion at the cross section of the dome outer circumference portion.

However, if the reflecting portion 9*a* is reduced to the minimum, namely, if the diaphragm is reduced to the minimum, it is obvious that providing the rising portion in the diagonal direction increases the size of the diaphragm, which provides the structure contradicting minimization.

Accordingly, increase in size can be avoided by providing the rising portion in the vertical form at the outer circumference portion of the dome of the reflecting portion. It is possible to provide the rising portion in the opposite direction to the dome shape, namely, substantially vertical in the upward direction shown in the drawings, but it becomes clear that in this direction, a film is easily broken in the film forming, and it also becomes possible that even if it can be formed, the film at the rising portion tends to be thin in this direction and the rib effect reduces by half.

For this disadvantage, it becomes clear that by providing the falling portion 8*b* at the outer circumference portion of the dome of the reflecting portion 8*a* as in the third embodiment, the film breakage is eliminated, satisfactory film thickness can be obtained, the rib effect can be sufficiently exhibited, and the effect is exhibited in enhancement of the performance of the diaphragm.

When there is a room in dimension, it is natural that the rising portion in the diagonal direction is naturally effective. Accordingly, the mode of the diaphragm shown in the fourth embodiment results in reinforcement of the reflecting portion as well as increase in the strength of the diaphragm, and therefore it has the advantage of improving the film forming performance and further increasing the strength of the diaphragm.

According to the structure as that of the present invention, in production of the film forming die used in forming the diaphragm, it is possible to produce it only by lathe-working, and its shape is simple. Accordingly, the advantage of sharply reducing the working cost is provided, the cost of the die is reduced more sharply than in the prior art, the fact that the slit working portion is the flat portion contributes to improvement in working precision of the slit width, and thus improvement in quality and performance as well as cost reduction can be achieved.

The invention claimed is:

1. An optical-acoustic transducer comprising a diaphragm with a support portion of a vibrating section being connected to the vibrating section vibrated with sound, with the suitable number of cantilevers, and a light emitter and a light receiver placed to oppose to a light reflecting portion formed at the vibrating section of the diaphragm, and detecting a change in a position of the vibrating section following the vibration of said vibrating section by receiving light, irradiated from said light emitter and reflected at the light reflecting portion of said vibrating section, at said light receiving element, wherein said cantilevers are formed by performing slit working for said diaphragm, and a portion between an outer circumference edge of said vibrating section and inner circumference edges of said cantilevers and a portion between an inner circumference edge of said support portion and outer circumference edges of said cantilevers are partitioned by said slit working, and said cantilevers extend along a portion between an outer circumference of said vibrating section and an inner circumference of said support portion, wherein a rising portion rising vertically or diagonally upward from an outer circumference edge of the light reflecting portion forming said vibrating section is provided along an entire circumference, a falling portion falling downward in an arc form from an upper end circumference edge of said rising portion is provided along an entire circumference, a flat portion extending horizontally to an outside from a lower end circumference edge of said failing portion is provided at an entire circumference, and the cantilevers extending alone the outer circumference of said vibrating section are formed at the flat portion, thereby to enhance the rigidity of the vibrating section so as to improve the optical-acoustic transducing characteristic.

2. The optical-acoustic transducer according to claim 1, wherein a slit partitioning the portion between the outer circumference edge of said vibrating section and the inner circumference edges of said cantilevers and the portion between the inner circumference edge of said supporting portion and the outer circumference edges of said cantilevers each comprises: at least three arc-shaped inner slits formed at the outer circumference of the vibrating section; at least three arc-shaped outer slits existing outside the inner slits and formed at the inner circumference of said supporting portion; and radial slits each coupling one end of each inner slit and one end of the outer slit formed outside the other inner slit adjacent to the one end of the inner slit.

3. The optical-acoustic transducer according to claim 2, wherein one end of said cantilever is connected to said vibrating section by a portion between the one end of each of the inner slits at a side to which the radial slit is coupled and the one end of the other inner slit adjacent to said inner slit at the side to which the radial slit is not coupled, and the other end of the cantilever is connected to said supporting portion by a portion between the one end of each of the outer slits at a side to which the radial slit is coupled and the one end of the other outer slit adjacent to said outer slit at the side to which the radial slit is not coupled.

4. The optical-acoustic transducer according to claim 1, wherein a flat portion extending horizontally to an outside from an outer circumference edge of the light reflecting portion forming said vibrating section is provided at an entire circumference of the outer circumference edge of the light reflecting portion forming said vibrating section, and the cantilevers extending along the outer circumference of said vibrating section are formed at the flat portion.

5. The optical-acoustic transducer according to claim 1, wherein an incline portion rising in a diagonal direction from an outer circumference edge of the light reflecting portion forming said vibrating section is provided at an entire circumference of the outer circumference edge of the light reflecting portion forming said vibrating section, a flat portion extending horizontally to an outside from an upper end circumference edge of said incline portion is further provided at the entire circumference, and the cantilevers extending along the outer circumference of said vibrating section are formed at the flat portion.

6. The optical-acoustic transducer according to claim 1, wherein a falling portion falling downward at the right angle or an angle near the right angle from an outer circumference edge of the light reflecting portion forming said vibrating section is provided at an entire circumference of the outer circumference edge of the light reflecting portion forming said vibrating section, a flat portion extending horizontally toward an outside from a lower end circumference edge of said falling portion is provided at the entire circumference, and the cantilevers extending along the outer circumference of said vibrating section are formed at the flat portion.

* * * * *